US008576458B2

(12) United States Patent
Herloski et al.

(10) Patent No.: US 8,576,458 B2
(45) Date of Patent: Nov. 5, 2013

(54) PRINTING SYSTEM, RASTER OUPUT SCANNER, AND METHOD WITH ELECTRONIC BANDING COMPENSATION USING FACET-DEPENDENT SMILE CORRECTION

(75) Inventors: Robert Herloski, Webster, NY (US); Jack Lestrange, Macedon, NY (US); Timothy Clark, Marion, NY (US); Jess Gentner, Rochester, NY (US); Edward W. Smith, Jr., Wolcott, NY (US); Howard Mizes, Pittsford, NY (US); Robert P. Loce, Webster, NY (US); Beilei Xu, Penfield, NY (US); Joseph C. Sheflin, Macedon, NY (US)

(73) Assignee: Xerox Corporation, Norwalk, CT (US)

( * ) Notice: Subject to any disclaimer, the term of this patent is extended or adjusted under 35 U.S.C. 154(b) by 124 days.

(21) Appl. No.: 13/313,533

(22) Filed: Dec. 7, 2011

(65) Prior Publication Data
US 2013/0148172 A1 Jun. 13, 2013

(51) Int. Cl.
*H04N 1/04* (2006.01)

(52) U.S. Cl.
USPC ........... 358/474; 358/481; 358/475; 347/243; 347/259

(58) Field of Classification Search
USPC ......... 358/505, 501, 464, 488, 449, 474, 481; 347/243, 259, 261, 229, 234
See application file for complete search history.

(56) References Cited

U.S. PATENT DOCUMENTS

| 5,093,745 | A | * | 3/1992 | Kuroda | 359/217.1 |
|---|---|---|---|---|---|
| 5,248,997 | A | * | 9/1993 | Summers | 347/261 |
| 5,519,514 | A | | 5/1996 | TeWinkle | |
| 5,550,563 | A | | 8/1996 | Matheny et al. | |
| 5,680,541 | A | | 10/1997 | Kurosu et al. | |
| 5,900,901 | A | | 5/1999 | Costanza et al. | |
| 6,307,584 | B1 | * | 10/2001 | Hirst et al. | 347/243 |
| 6,342,963 | B1 | | 1/2002 | Yoshino | |
| 6,462,821 | B1 | | 10/2002 | Borton et al. | |
| 6,567,170 | B2 | | 5/2003 | Tandon et al. | |
| 6,621,576 | B2 | | 9/2003 | Tandon et al. | |
| 6,636,253 | B2 | * | 10/2003 | Nishiguchi et al. | 347/259 |
| 6,760,056 | B2 | | 7/2004 | Klassen et al. | |
| 6,859,295 | B2 | * | 2/2005 | Matsuoka | 359/207.2 |
| 6,940,536 | B2 | * | 9/2005 | Rauch et al. | 347/249 |
| 6,975,949 | B2 | | 12/2005 | Mestha et al. | |
| 7,024,152 | B2 | | 4/2006 | Lofthus et al. | |
| 7,058,325 | B2 | | 6/2006 | Hamby et al. | |
| 7,120,369 | B2 | | 10/2006 | Hamby et al. | |
| 7,136,616 | B2 | | 11/2006 | Mandel et al. | |
| 7,177,585 | B2 | | 2/2007 | Matsuzaka et al. | |
| 7,391,542 | B2 | * | 6/2008 | Tanimura et al. | 358/481 |
| 7,492,381 | B2 | | 2/2009 | Mizes et al. | |
| 7,564,475 | B1 | | 7/2009 | Mizes | |
| 7,834,900 | B2 | * | 11/2010 | Ramesh et al. | 347/240 |
| 7,855,806 | B2 | | 12/2010 | Paul et al. | |
| 7,884,816 | B2 | * | 2/2011 | Burroughs et al. | 345/213 |
| 7,911,652 | B2 | | 3/2011 | Goodman et al. | |
| 7,965,397 | B2 | | 6/2011 | Paul | |
| 8,022,347 | B2 | * | 9/2011 | Tatsuno et al. | 250/205 |
| 2004/0036705 | A1 | | 2/2004 | Jung et al. | |
| 2004/0135878 | A1 | | 7/2004 | Mizes et al. | |

(Continued)

*Primary Examiner* — Negussie Worku
(74) *Attorney, Agent, or Firm* — Fay Sharpe LLP

(57) ABSTRACT

Raster Output Scanners and printing systems are presented along with methods for mitigating banding in printing systems, in which electronic banding compensation is employed using cross-process direction light source intensity banding correction profiles tailored to corresponding reflective facets of a rotating polygon.

14 Claims, 5 Drawing Sheets

(56) References Cited

U.S. PATENT DOCUMENTS

| | | |
|---|---|---|
| 2004/0179090 A1 | 9/2004 | Klassen et al. |
| 2005/0099446 A1 | 5/2005 | Mizes et al. |
| 2005/0134623 A1 | 6/2005 | Mizes |
| 2005/0134624 A1 | 6/2005 | Mizes |
| 2007/0052991 A1 | 3/2007 | Goodman et al. |
| 2007/0139509 A1 | 6/2007 | Mizes et al. |
| 2007/0236747 A1 | 10/2007 | Paul et al. |
| 2009/0002724 A1 | 1/2009 | Paul et al. |
| 2011/0058184 A1 | 3/2011 | Ramesh et al. |
| 2011/0058186 A1 | 3/2011 | Ramesh et al. |
| 2011/0058226 A1 | 3/2011 | Ramesh et al. |
| 2011/0228030 A1* | 9/2011 | Maeda .......................... 347/118 |
| 2011/0298883 A1* | 12/2011 | Ohyama ....................... 347/224 |

* cited by examiner

PRINTING SYSTEM, RASTER OUPUT SCANNER, AND METHOD WITH ELECTRONIC BANDING COMPENSATION USING FACET-DEPENDENT SMILE CORRECTION

BACKGROUND

The present exemplary embodiments relate to printing systems with raster output scanner (ROS) apparatus and to techniques for mitigating banding errors. Reprographic printing systems are used to create marked images on paper or other remarkable media, and improving the quality of the produced images is a continuing goal. Final image quality is affected by various sources of noise and errors in a reprographic system, leading to density variations in the marking material fused to the final print medium. In the reprographic process, a photoreceptor travels along a process direction, and images and text are formed as individual scan lines or groups of scan lines (sometimes referred to as a swath) in a raster scanning process in a cross-process direction, where the process direction motion is much slower than the raster scanning in the cross-process direction. Accordingly, the cross-process scanning direction is sometimes referred to as a "fast scan" direction, and the process direction is referred to as a "slow scan" direction.

Certain sources of reprographic system noise and errors caused periodic density variations in the process direction, which are sometimes referred to as "banding" errors. Periodic density variations may be characterized by frequency, amplitude, and phase in relation to a fundamental frequency, as well as harmonics. Various sources of banding exist in a marking (or print) engine. For example, raster output scanners employ rotating polygon mirror apparatus driven by a motor, known as a motor polygon assembly or MPA, with one or more light sources being scanned by rotation of the MPA such that scan lines are generated in the fast scan (cross-process) direction through reflection off a reflective facet of the rotating polygon mirror apparatus.

Differences in reflectivity, shape, profile, orientation, etc. in different reflective facets of the polygon lead to differences in image density (color intensity) in the final print out which are a function of which polygon facet was used to create a given scan line or swath of scan lines. As a result, the final print image may include bands of variations from the desired density that are periodic in the process direction. Other sources of banding errors include gears, pinions, and rollers in charging and development modules; jitter and wobble in imaging modules, as well as photoreceptors and associated drive trains. Banding usually manifests itself as periodic density variations in halftones in the process direction. The period of these defects is related to the once around frequency of the banding source. If not addressed, such periodic process direction density variations can render a reprographic printing system unacceptable, particularly where the banding errors are visually perceptible.

Banding can be addressed through reductions in the sources of such noise or errors and/or by compensation in various reprographic system components in order to counteract its affects, typically by injecting a known error that offsets the banding resulting from the sources of such periodic density variations. There are many various errors that produce banding at the 1× (and multiples) of the revolution frequency of the MPA (motor polygon assembly) in reprographic systems using a raster output scanner. In practice, it is difficult to completely eliminate the error sources that contribute to MPA harmonic banding, or even to reduce them enough to avoid perceptible periodic density variations. In addition, customer requirements are continually reducing the amount banding that is deemed to be acceptable. Consequently, banding compensation techniques have become an important tool in meeting reprographic system performance specifications. For instance, ROS exposure power can be varied in a controlled fashion to compensate for banding, and conventional banding compensation techniques include measurement of banding (including from multiple sources) and the use of that information to actuate some correction strategy on a scanline by scanline basis (including ROS exposure variation) to combat banding. However, conventional banding compensation approaches do not address cross-process (fast scan) direction density variation in banding, and instead average test prints in the cross-process direction to get a one-dimensional banding profile which is then used to derive the banding compensation independent of cross-process banding density variation information).

The following documents are incorporated by reference in their entireties: U.S. Pat. App. Publication No. 2011/0058186 to Ramesh et al., filed Sep. 8, 2009, Least Squares Based Coherent Multipage Analysis of Printer Banding for Diagnostics and Compensation; U.S. Pat. App. Publication No. 2011/0058226 to Ramesh et al., filed Sep. 8, 2009, Banding Profile Estimation using Spline Interpolation; U.S. Pat. App. Publication No. 2011/0058184 to Ramesh et al., filed Sep. 8, 2009, Least Squares Based Exposure Modulation for Banding Compensation; U.S. Pat. App. Publication No. 2007/0052991 to Goodman et al., filed Sep. 8, 2005, Methods and Systems for Determining Banding Compensation Parameters in Printing Systems; U.S. Pat. App. Publication No. 2009/0002724 to Paul et al., filed Jun. 27, 2007, Banding Profile Estimator using Multiple Sampling Intervals; U.S. Pat. App. Publication No. 2007/0139509 to Mizes et al., filed Dec. 21, 2005, Compensation of MPA Polygon Once Around with Exposure Modulation; U.S. Pat. App. Publication No. 2007/0236747 to Paul et al., filed Apr. 6, 2006, Systems and Methods to Measure Banding Print Defects; U.S. Pat. No. 7,120,369 to Hamby et al.; U.S. Pat. No. 7,058,325 to Hamby et al; U.S. Pat. No. 5,519,514 to TeWinkle; U.S. Pat. No. 5,550,653 to TeWinkle et al.; U.S. Pat. No. 5,680,541 to Kurosu et al.; U.S. Pat. No. 6,621,576 to Tandon et al.; U.S. Pat. No. 6,432,963 to Yoshino; U.S. Pat. No. 6,462,821 to Borton et al.; U.S. Pat. No. 6,567,170 to Tandon et al., U.S. Pat. No. 6,975,949 to Mestha et al.; U.S. Pat. No. 7,024,152 to Lofthus et al.; U.S. Pat. No. 7,136,616 to Mandel et al.; U.S. Pat. No. 7,177,585 to Matsuzaka et al.; and U.S. Pat. No. 7,492,381 to Mizes et al.

BRIEF DESCRIPTION

The present disclosure relates to electronic banding compensation in reprographic systems such as printers, multifunction devices, etc., using cross-process direction light source intensity banding correction profiles corresponding to particular reflective facets of a rotating polygon. The disclosed systems and techniques thus provide the ability to correct the cross-process dependence of the process direction variations attributable to a raster output scanner. In particular applications, the disclosed techniques provide electronic banding compensation to correct periodic density variations due to ROS polygon (once around) errors, including facet dependent variations. In this regard, the inventors have appreciated that MPA harmonic banding can vary in amplitude and phase in the cross-process (fast scan) direction, and the disclosed systems and techniques provide an actuator, in certain embodiments a ROS light output profile, that varies in the fast scan direction. Consequently, periodic variations in the process direction that may have different amplitude and phase for different cross-process direction positions can be corrected, which was not previously possible using conventional banding correction techniques.

A document processing system and raster output scanner thereof are provided in accordance with various aspects of the disclosure, which may include a single light source or a plurality of light sources, such as lasers, along with a driver to selectively actuate the light source(s) according to image data to produce one or more modulated light outputs. A rotating polygon is provided with a plurality of reflective facets to scan the modulated light output(s) to a photoreceptor of a printing system along a fast scan direction in order to generate an image on all or a portion of the photoreceptor according to the image data. In addition, a ROS controller is provided which causes the driver to selectively vary an output level of the modulated light output(s) during scanning by a given reflective facet of the rotating polygon to mitigate banding using a given one of a plurality of banding correction profiles that corresponds to the given reflective facet. It is noted that conventional smile correction compensates for optical transmission variations from a start of scan (SOS) edge to an end of scan (EOS) edge by applying a profile to change laser power in the fast scan direction. However, unlike conventional smile correction profiles that are applied to the light output independent of which ROS polygon facet is currently being used, embodiments of the present disclosure associate a particular banding correction profile with a corresponding polygon facet, which provides selective adjustment of the light output along the fast scan direction. This approach advantageously facilitates correction of fast scan direction position-dependent variation in sources of banding error, such as polygon facets, etc.

In certain multi-beam ROS embodiments, the modulated outputs of multiple light sources are scanned in the cross-process by a given reflective polygon facet, and the controller causes the driver to selectively vary output levels of individual ones of the plurality of modulated light outputs according to banding correction profiles corresponding to the individual light sources and to the given reflective facet. In this manner, banding correction profiles may be particularized to individual ones of a plurality of light sources for further improvement in mitigating banding. In certain embodiments, moreover, an encoder provides an indication to the controller of the identity of the given reflective facet, and the controller selects the smile correction profile(s) corresponding to the given reflective facet according to the indication from the encoder.

In accordance with further aspects of the present disclosure, methods are provided for mitigating banding in a printing system. The methods include selectively actuating one or more light sources according to image data to produce one or more modulated light outputs. The method also involves scanning the modulated light output(s) directly or indirectly to a photoreceptor using a given one of a plurality of reflective facets of a rotating polygon along a fast scan direction to generate an image thereon according to the image data. In addition, the method includes selectively varying an output level of the modulated light output(s) during scanning according to a given one of a plurality of banding correction profiles which corresponds to the given reflective facet.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Figure 1:
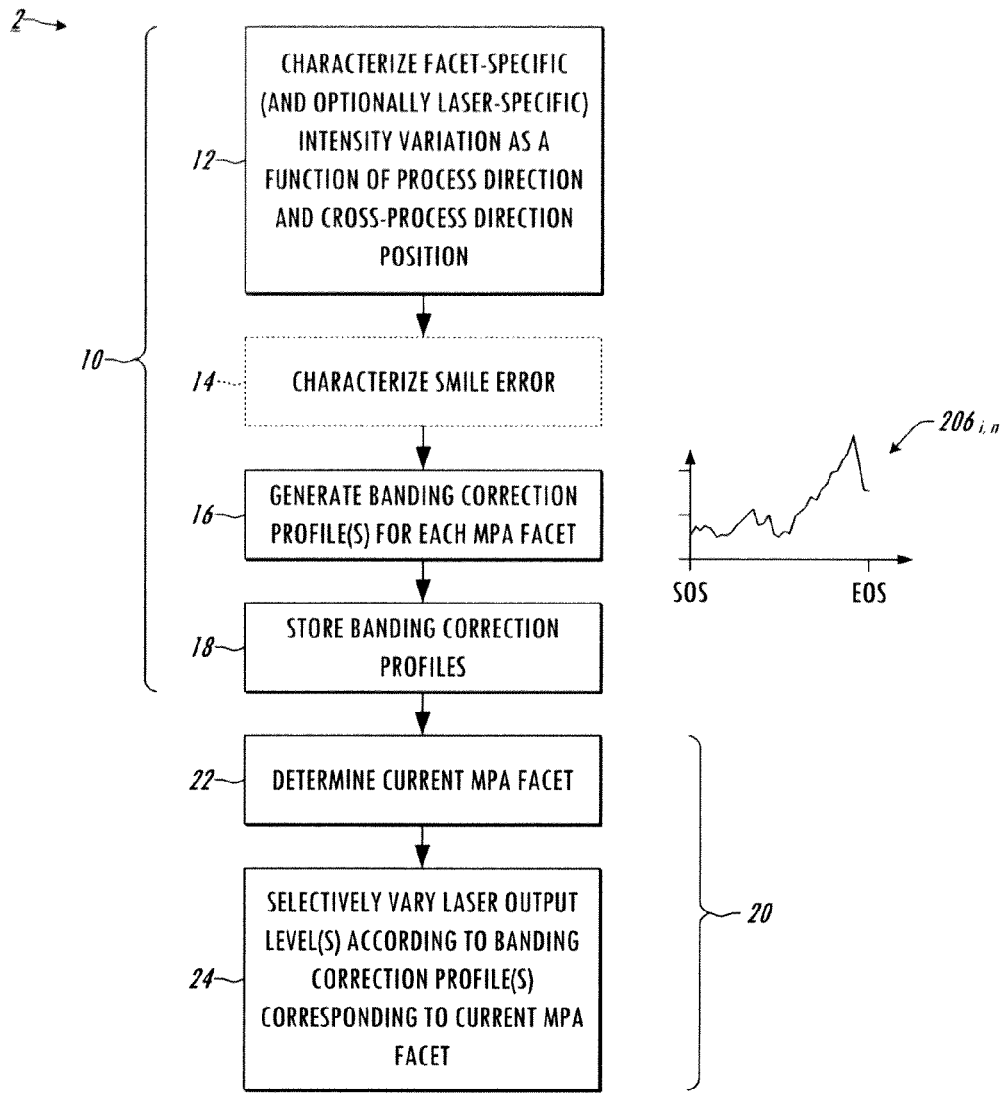
FIG. 1 is a flow diagram illustrating an exemplary method for generating facet-specific banding correction profiles and for mitigating banding in a printing system in accordance with one or more aspects of the present disclosure.

Several embodiments or implementations of the different aspects of the present disclosure are hereinafter described in conjunction with the drawings, wherein like reference numerals are used to refer to like elements throughout, and wherein the various features, structures, and graphical renderings are not necessarily drawn to scale. The disclosure relates to banding compensation in printing systems employing a single or multi-beam ROS using compensation profile data particularized to individual facets of a multi-facet motor polygon assembly (MPA). The inventors have appreciated that MPA harmonic banding in a printing system often varies in amplitude and phase in the cross-process (fast scan) direction, and that conventional banding compensation techniques failed to address this fast scan direction variation. Further, the inventors have found that conventional fast scan direction compensation, known as smile correction, is incapable of addressing the cross-process direction banding errors, particularly those associated with a ROS MPA.

Accordingly, the present disclosure provides raster output scanner apparatus and electronic banding compensation techniques by which banding can be corrected or mitigated using correction profiles particularized to ROS MPA reflective facets, which concepts can be advantageously employed in a variety of raster output scanning applications including without limitation reprographic printers and document processing systems. These concepts are illustrated and described in exemplary document processing systems with marking devices for creating images on light receiving structures such as an intermediate transfer medium (e.g., photoreceptor drum or belt) using raster output scanning with associated scanners and optics in a printing or document processing system. However, the techniques and ROS systems of the present disclosure may be implemented in other forms of image generating or rendering systems.

FIG. 1 illustrates an exemplary method 2 for generating facet-specific banding correction profiles 206 by first learning a two-dimensional correction 10 via a sequenced test pattern and sensing scheme and then generating banding correction profiles for each MPA facet, and optionally for each light source in a multiple laser ROS, which can then be stored in the document processing system for use by the ROS controller. In addition, the method 2 of FIG. 1 illustrates banding mitigation 20 in a printing system using the banding correction profile corresponding to the current MPA facet 226 during scanning in the fast scan direction.

Figure 2:
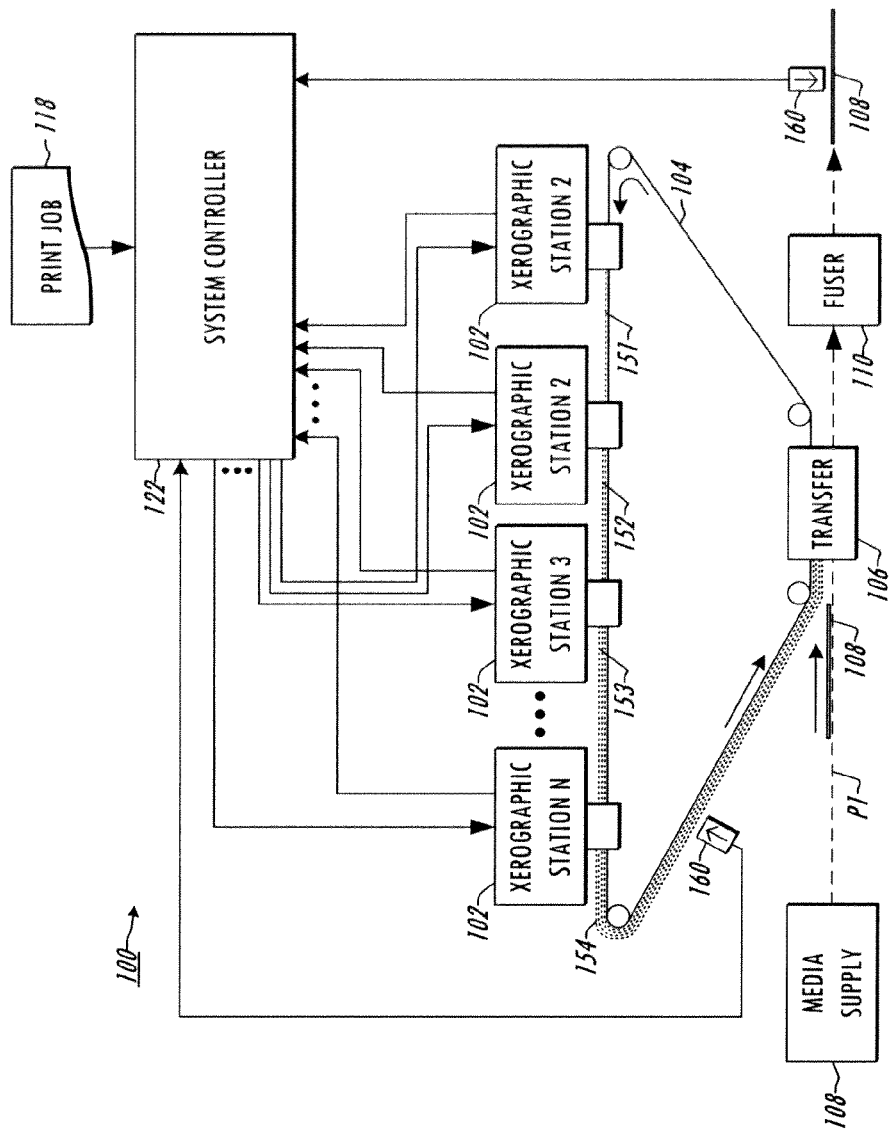
FIG. 2 is a simplified schematic system level diagram illustrating an exemplary multi-color document processing system in which the marking devices individually include ROSs in accordance with various aspects of the disclosure.
Figure 3:
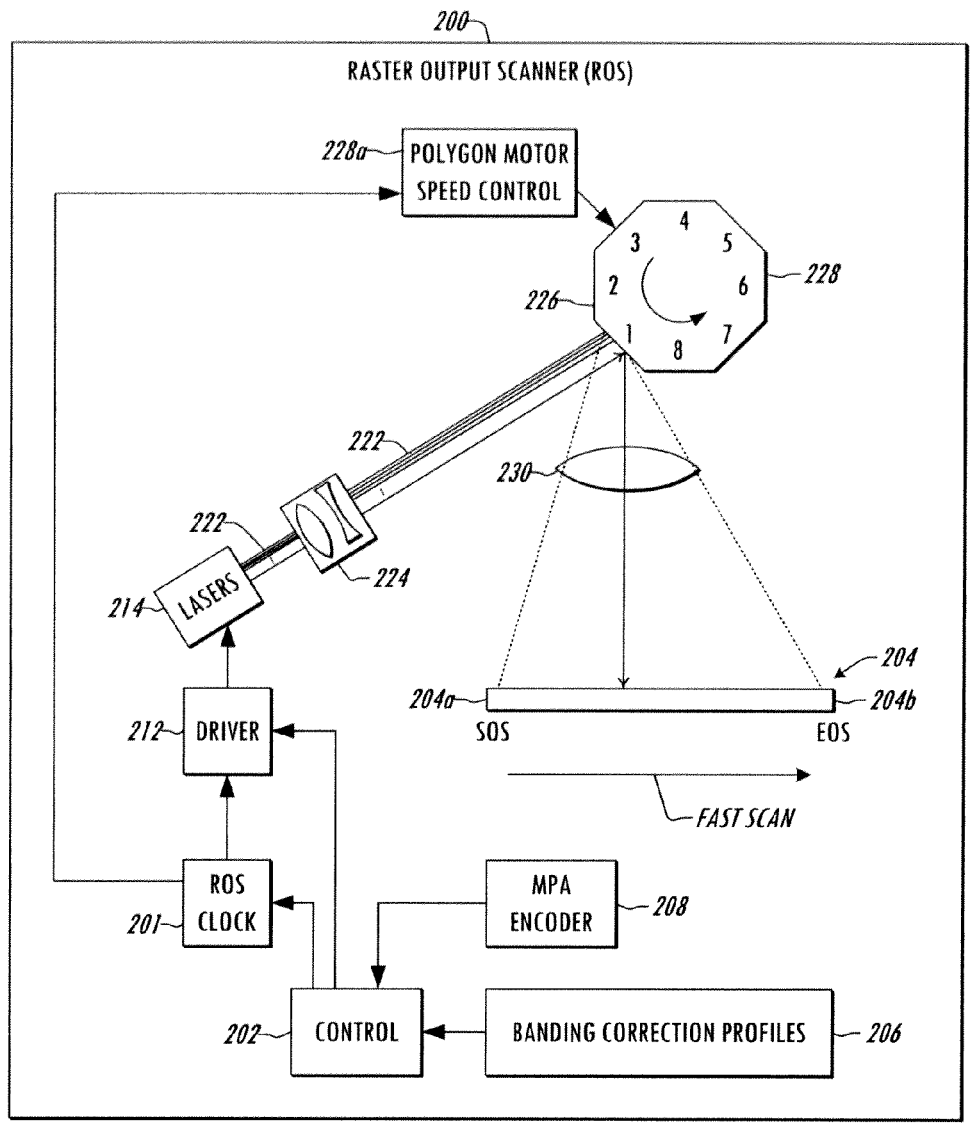
FIGS. 3-5 are simplified schematic diagrams illustrating an exemplary ROS using MPA facet-specific banding correction profiles for compensation of banding errors in accordance with various aspects of the disclosure.
Figure 4:
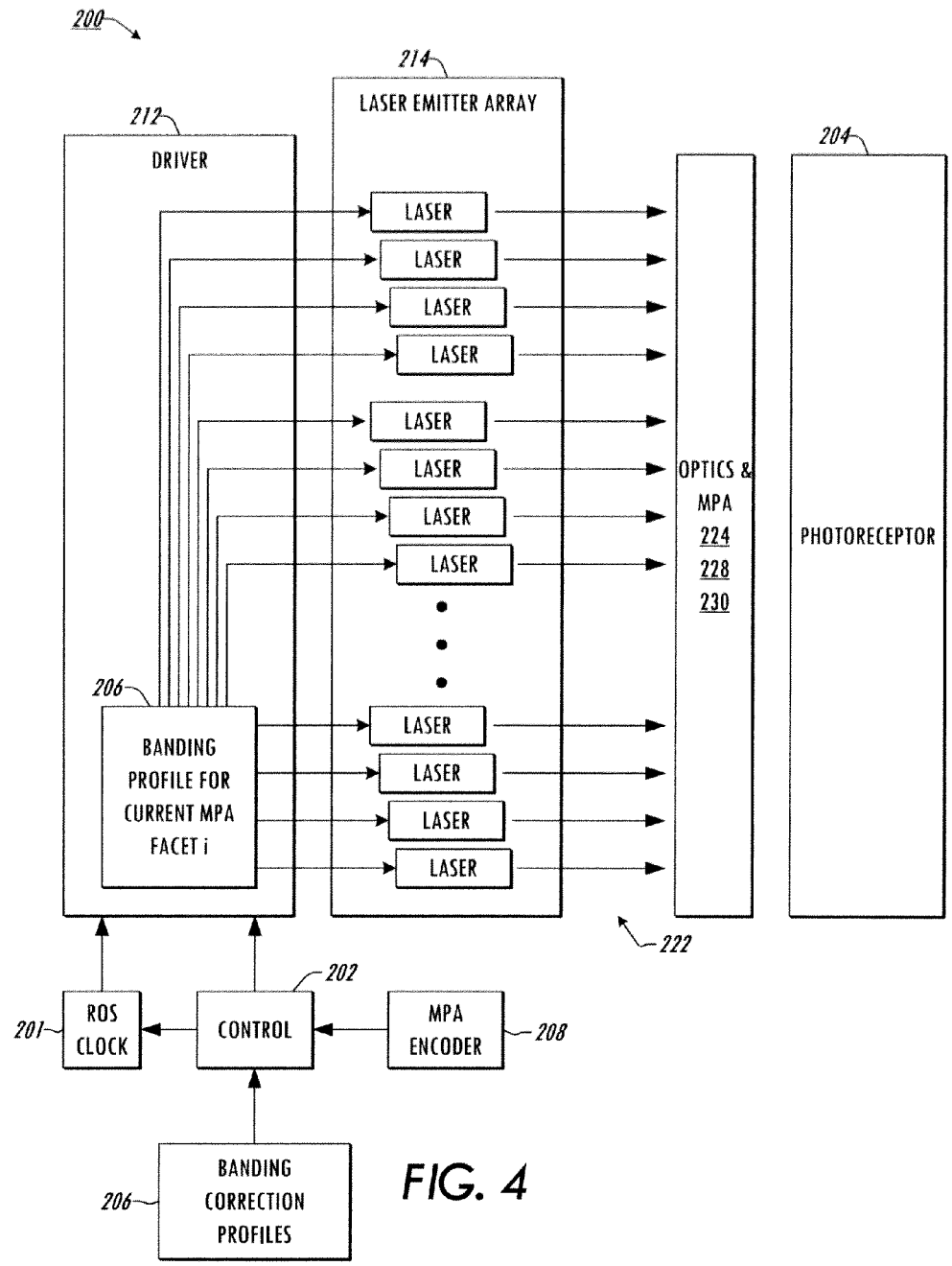
Figure 5:
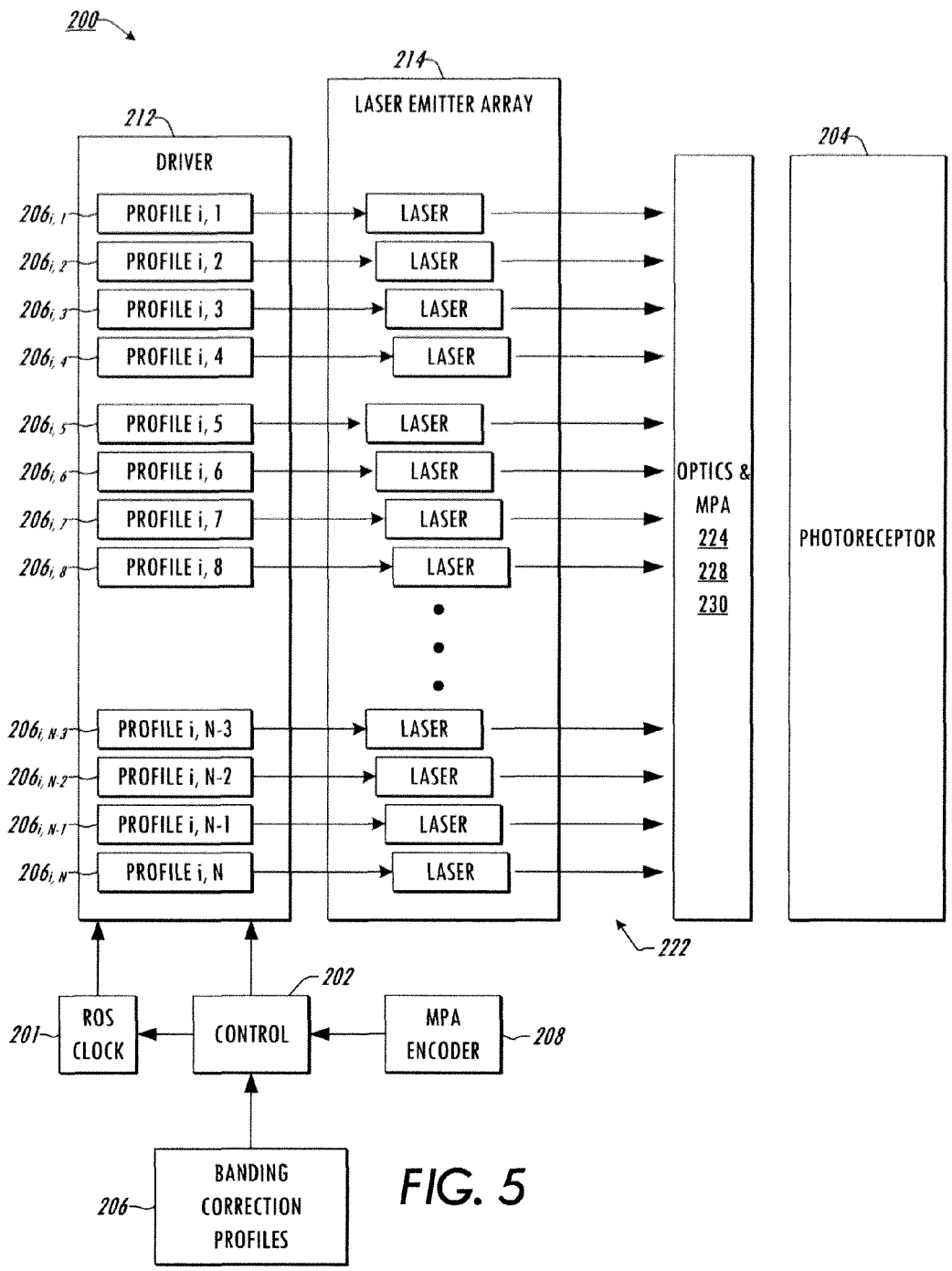

At 12 in FIG. 1, facet-specific intensity variations are characterized in the test print as a function of process-direction and cross-process direction position on a test page printed using a document processing system (e.g., system 100 of FIGS. 2-5). Optionally at 12, the test print can be used to characterize laser-specific intensity variations where the document processing system 100 includes a multi-beam ROS. It is noted in this regard that facet-specific intensity variations can be characterized using test prints as described, or using intensity variations measured at any location in a reprographic system, which can be measurements taken from test prints or measurements at any other location within a document processing system 100. For instance, on-board sensors can be employed which measure intensity of a developed image on a photoreceptor within a printing system, by which measurements of facet-specific intensity variations can be obtained and characterized at 12 in FIG. 1. Such sensors can be used for this purpose as well as other purposes, such as for correction of streaks which are perpendicular relative to banding artifacts. Conventional smile correction characterization can be done at 14, for instance to characterize cross-process direction effects (for example, such as optical transmission efficiency variation) causing intensity variations at different positions from an inboard start of scan (SOS) edge of a photoreceptor 204 to an outboard end of scan (EOS) edge thereof. Banding correction profiles 206 are generated at 16 for each MPA facet 226 using any suitable algorithm or mathematical technique by which intensity variations in the test print are counteracted or mitigated through adjustment of light source intensity output (power output) according to the generated correction profiles 206. In this regard, the correction profile 206 can be any set of numbers, lookup table, parametric equation, etc. by which a ROS driver can selectively adjust the light output of one or more lasers or other light sources used to scan image data in the cross-process direction during operation of the system 100. In certain embodiments, for instance those including multiple light sources 214 (FIG. 5 below), banding correction profiles 206 can be generated at 16 for individual light sources 214 or groups thereof for each MPA facet 226. At 18, the generated banding correction profiles 206 are stored, for instance in an electronic memory of the document processing system 100 for subsequent use by a ROS controller 202 and driver 212 (FIGS. 3-5).

FIG. 1 also shows a process 20 that can be employed in operation of the document processing system 100 to mitigate banding. At 22, the current MPA facet is determined, for instance by a ROS controller 202 using an output of a rotary encoder 208 (FIG. 3) operatively coupled to the motor polygon assembly. At 24, the laser output level or levels of the ROS 200 are selectively varied according to one or more banding correction profiles 206 which correspond to the current MPA facet 226 determined at 22. In this manner, unlike prior banding correction techniques, the specific effects of a particular MPA facet 226 are used in generating one or more corresponding banding correction profiles 206, and the banding correction profile or profiles 206 used in operation are selected according to the current MPA facet 226 being used in scanning the light output of the light source(s) 214, whereby cross-process direction banding effects can be reduced or eliminated. Moreover, unlike conventional smile correction, the techniques of FIG. 1 take into account the cross-process direction errors associated with a given rotating polygon and the facets 226 thereof, and the banding correction profiles 206 are constructed and used in a manner that counteracts these effects.

FIGS. 2-5 show a document processing system 100 (FIG. 2) and ROS 200 thereof (FIGS. 3-5) in which stored banding correction profiles 206 are used to selectively vary the output level of one or more modulated light outputs 222 to mitigate banding in accordance with one or more aspects of the disclosure. An exemplary tandem multi-color document processing system 100 is shown in FIG. 2 with a system controller 122. Marking devices 102 individually include a ROS 200 (FIGS. 3-5) that may be initially setup or thereafter adjusted for banding correction in accordance with the method 2 above. The marking devices or print engines 102 individually transfer toner marking material onto an intermediate substrate 104 that may or may not be a photoreceptor, in this case, a shared intermediate transfer belt 104 (ITB) traveling in a counter clockwise direction in the figure past the marking devices 102.

As seen in FIG. 3, in certain embodiments, the marking devices 102 individually include a cylindrical drum photoreceptor 204 employed as an intermediate transfer substrate for subsequent transfer to the intermediate transfer belt 104 before final image transfer to a final printable media 108, such as cut sheet paper. The illustrated printing system 100 includes a transfer component or station 106 (FIG. 2) downstream of the marking devices 102 along a lower portion of the IBT path to transfer marking material from the IBT 104 to an upper side of a final print medium 108 traveling along a path P1 from a media supply. After the transfer of toner to the print medium 108 at the transfer station 106 in FIG. 2, the final print medium 108 is provided to a fuser type affixing apparatus 110 along the path P1 where the transferred marking material is fused to the print medium 108. In other embodiments, a single photoreceptor belt photoreceptor belt 104 is used with the marking devices 102 forming an image on the photoreceptor belt 104, and the image developed on the belt is directly transferred to a printed medium (e.g., paper). In this regard, the banding compensation techniques illustrated and described herein can be employed in intermediate belt transfer (IBT) type systems and/or in non-IBT systems.

The system controller 122 performs various control functions and may implement digital front end (DFE) functionality for the system 100. The controller 122 may be any suitable form of hardware, processor-executed software and/or firmware, programmable logic, or combinations thereof, whether unitary or implemented in distributed fashion in a plurality of processing components. In a normal printing mode, the controller 122 receives incoming print jobs 118 and operates one or more of the marking devices 102 to transfer marking material onto the ITB 104 in accordance with image data of the print job 118. In operation of the marking devices 102, marking material (e.g., toner 151 for the first device 102 in FIG. 2) is supplied to an internal drum photoreceptor 204 (schematically shown in FIG. 3) via a ROS 200 of the marking device 102. A surface of the intermediate medium 104 is adjacent to and/or in contact with the drum photoreceptor 204 and the toner 151 is transferred to the ITB 104 with the assistance of a biased transfer roller (not shown) to attract oppositely charged toner 151 from the drum 204 onto the ITB surface as the ITB 104 passes through a nip between the drum 204 and the biased transfer roller. The toner 151 ideally remains on the surface of the ITB 104 after it passes through the nip for subsequent transfer and fusing to the final print media 108 via the transfer device 106 and fuser 110 in FIG. 2. In the multi-color example of FIG. 2, each xerographic marking device 102 is operable under control of the controller 122 to transfer toner 151-154 of a corresponding color (e.g., cyan (C), magenta (M), yellow (Y), black (K)) to the transfer belt 104.

In normal operation, print jobs 118 are received at the controller 122 via an internal source such as a scanner (not shown) and/or from an external source, such as one or more computers connected to the system 100 via one or more networks, or from wireless sources. The print job execution may include printing selected text, line graphics, images, magnetic ink character recognition (MICR) notation, etc., on the front and/or back sides or pages of one or more sheets of paper or other print final media 108. In this regard, some sheets may be left completely blank in accordance with a particular print job 118, and some sheets may have mixed color and black-and-white printing. Execution of the print job 118, moreover, may include collating the finished sheets in a certain order, along with specified folding, stapling, punching holes into, or otherwise physically manipulating or binding the sheets. The system 100 can include one or more sensors 160 internal to the marking stations 102 and/or external thereto, for instance, to measure one or more marking material transfer characteristics relative to the intermediate transfer belt 104 or other photoreceptor or with respect to a final printed medium 108, and corresponding feedback signals or values are provided to the controller 122.

As seen in FIGS. 3-5, the exemplary xerographic stations 102 each include a single or multi-beam ROS 200 which generates latent images along a circuitous length of a drum type photoreceptor 204 (shown in partial section view with the process direction into the page in FIG. 3) using a plurality of beams 222. While illustrated in the context of the multi-beam ROS 200, the various aspects of the present disclosure can also be used in a single-beam ROS. A ROS controller 202 provides one or more control signals or values to a driver 212 and a ROS clock 201, and a stream of image data is provided from the controller 202 to the driver 212 associated with 32 laser-type light sources 214, for instance, arranged as a laser emitter array of eight groups of four lasers in one embodiment. The ROS controller 202 also operates the ROS clock 201, which in turn provides a clock output to the driver 212 and to a motor polygon assembly (MPA) that includes a polygon motor speed control 228a and a rotating polygon 228 with a plurality of reflective (e.g., mirrored) outer surfaces or facets 226 (eight facets 226 in the example of FIG. 3).

In operation, a stream of image data is provided to the driver 212 associated with a single color portion of a panel image in the printer of FIG. 2, and the driver 212 modulates the lasers 214 to produce a plurality of modulated light outputs or beams 222 in conformance with the input image data. The laser beam light output 222 passes into conditioning optics 224 and then illuminates a facet 226 of the rotating polygon 228. The light beams 222 are reflected from the polygon facet 226 through imaging optics 230 to form corresponding spots on the photosensitive image plane portion of the passing photoreceptor 204 drum. Rotation of the facet 226 causes the spots to be swept or scanned across the image plane in the cross-process or fast scan direction to form a succession of scan lines generally perpendicular to a "slow scan" or process direction along which the photoreceptor 204 travels. In the multi-beam arrangement of the ROS 200, 32 such scan lines are created concurrently as a group or swath with the image data provided to the individual lasers 214 being interleaved accordingly. Successive rotating facets 226 of the polygon 228 form successive sets or swaths of 32 scan lines that are offset from each other as the photoreceptor 204 travels in the process direction. In this regard, each facet 226 may scan 32 scan lines, but the photoreceptor 204 may move such that the top 16 scan lines from the next facet 226 can overlap the bottom 16 scan lines from the previous facet 226 in an interleaved or overlapped fashion. In this regard, the disclosed concepts can be used in systems in which scan lines are overwritten (overlapped) with or without interleaving, and/or in systems that employ interleaving with scan lines from a subsequent swath written in between scan lines from a previous swath, or combinations or variations thereof.

Within each set of 32 scan lines, moreover, the laser emitter array 214 provides mechanical spacing of the individual light outputs 222 such that the spacing of adjacent scan lines is ideally uniform. Each such scan line in this example consists of a row of pixels produced by modulation of the corresponding laser beam 222 according to the corresponding image data as the laser spots scan across an image plane, where individual spots are either illuminated or not at various points as the beams scan across the scan lines so as to selectively illuminate or refrain from illuminating individual locations on the photoreceptor 204 according to the input image data. In this way a latent image is created by selectively discharging the areas of the photoreceptor 204 which are to receive a toner image. Exposed (drawn) portions of the image to be printed move on to a toner deposition station (not shown) where toner adheres to the drawn/discharged portions of the image. The exposed portions of the image with adherent toner then pass to a transfer station with a biased transfer roller (BTR, not shown) for transfer of the toner image to the intermediate transfer belt (ITB 104 in FIG. 2 above).

As seen in FIGS. 3-5, moreover, the ROS driver 212 selectively employs banding correction or compensation profiles 206 under direction of the ROS controller 202 to vary the output level of the light outputs 222 provided by the light source or sources 214 during scanning by a given reflective facet 226 in order to mitigate banding in the final print media 108. The MPA polygon 228 then directs the modulated light outputs 222 toward the photoreceptor medium 204 along the fast scan direction to generate an image on at least a portion of the medium 204. As seen in FIG. 3, moreover, rotation of the current facet 226 of the polygon 228 scans the one or more modulated light outputs 222 directly or indirectly to the photoreceptor 204 along the fast scan direction, where one or more optical components may lie between the polygon facet 226 and the photoreceptor 204, where one simplified example (lens 230) is illustrated in FIG. 3. In operation, the controller 202 of the ROS 200 (FIGS. 3-5) causes the driver 212 to selectively vary the output level of the light output(s) 222 provided by the light source(s) 214 during scanning by a given reflective facet 226 so as to mitigate banding according to a given one of the banding correction profiles 206 that corresponds to the given reflective facet 226.

In certain embodiments, the ROS 200 includes an MPA encoder 208 which provides an output to the ROS controller 202, which can be any signal or value that indicates the identity of the given reflective facet 226 of the rotating polygon 228 that is currently scanning light output(s) 222. The controller 202, in turn, selects a given one of a plurality of banding correction profiles 206 that corresponds to the given reflective facet 226 according to the indication from the MPA encoder 208. In this manner, one or more selected banding correction profiles 206 are insured to correspond to the currently-used MPA facet 226, and thus the particular banding effects associated with the current MPA facet 226 can be effectively mitigated through selection of the proper (corresponding) banding correction profile or profiles 206.

As seen in FIG. 4, in certain embodiments that use multiple light sources 214 (e.g., an array of 32 lasers 214 in the illustrated example), the controller 202 may cause the driver 212 to selectively vary the output level of all the modulated light outputs 222 provided by the light sources 214 according to a single profile 206 that corresponds to the current MPA facet 226. In one possible implementation, the ROS 200 may include programmable logic, such as an application specific integrated circuit (ASIC) that controls the operation of the laser source(s) 214.

The ROS ASIC in certain embodiments allows the controller 202 & driver 212 to vary the laser output level from the start of a scan (SOS) to the end of a scan (EOS) across the fast scan direction (SOS and EOS shown schematically in FIG. 3). It is noted that this feature can be used in simplified form for "smile correction" to compensate for ROS output intensity variation and optical system effects in the fast scan/cross process direction with respect to density variations that may be independent of MPA facet. Moreover, as noted at 14 in FIG. 1 above, such effects can be characterized and used in the generation of the banding correction profiles 206, for instance, with the normal "smile correction" effects being added into the characterization of the facet-specific banding effects such that the generated banding correction profiles 206 operate to counteract oath the non-facet-specific (smile correction) effects as well as the facet-specific banding effects.

In the example of FIG. 4, moreover, the controller 202 uses the indication from the MPA encoder 208 to identify which MPA facet 226 is currently being used for cross-process direction scanning in the ROS 200, and selects the corresponding banding correction profile 206 from the plurality of profiles 206 (e.g., stored in ROS memory) and causes the driver 212 to modify or vary the outputs of the laser array 214 according to the selected profile 206. For instance, if the first MPA facet 226 (facet "1" in FIG. 3) is currently being used to reflect the light outputs 222 from the laser array 214, the controller 202 receives an indication of the current facet 226 from the MPA encoder 208, and accordingly selects the banding profile 206 for MPA facet "1". In this example, the ROS 200 stores an integer number "i" of banding correction profiles 206, where i=8 in the illustrated situation in which the rotating polygon 228 includes a total of 8 reflective facets 226. Other implementations are possible where i is any positive integer greater than 1, where i corresponds to the number of facets 226 of a given rotating polygon 228.

In other embodiments, the ROS 200 may employ a single laser or other type of light source 214, in which case the controller 202 selects a particular banding profile 206 according to the indication from the encoder 208 from a plurality of banding correction profiles 206 including an integer number i profiles 206 (i greater than 1) corresponding to the number of polygon facets 226.

Referring also to FIG. 5, another example is shown using multiple laser light sources 214 (e.g., 32 in the illustrated implementation), in which more than one banding correction profile 206 is used for a given MPA facet 226. In one possible embodiment, a profile $206_{i,N}$ is provided for each light source 214 for each MPA facet 226. For instance, in a ROS 200 having a polygon 228 with 8 rotating facets 226 (i=8) and 32 light sources 214 (N=32), a total of 256 banding correction profiles 206 can be stored in the ROS 200, with the controller 202 selecting a group of 32 of the profiles 206 for a given current MPA facet 226. The controller 202 then causes the driver 212 to selectively vary the outputs of the corresponding laser light sources 214 according to the corresponding one of the 32 selected profiles 206. In one possible implementation, the ROS 200 may include an ASIC or other logic providing the capability to modify 32 individual smile correction functions, wherein the controller 202 can utilize such logic to employ the facet-specific profiles 206 as the smile correction functions, and to update these according to the currently-used MPA facet 226. In other possible embodiments, two or more banding correction profiles 206 can be used for a given MPA facet 226, where two or more light sources 214 can use the same facet-specific profile 206.

The above embodiments thus allow the cross-process direction banding affects to be corrected on a scanline-by-scanline basis and/or on a swath-by-swath basis (electronic banding correction or compensation), thereby facilitating control over measurable MPA harmonic banding in a given document processing system 100, including the variation (amplitude and phase) in the cross-process direction, wherein the ROS controller 202 can employ a facet-by-facet variation in the smile correction function, varying in amplitude and phase in the cross-process/fast scan direction, which will compensate for MPA harmonic banding at all fast scan locations between the start of scan (SOS) and the end of scan (EOS) locations.

The above examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The invention claimed is:

1. A raster output scanner (ROS) for generating an image on a portion of a photoreceptor traveling along a process path past the ROS, comprising:
   at least one light source operative to generate a light output;
   a driver operative to selectively actuate the at least one light source according to image data to produce at least one modulated light output;
   a motor polygon assembly comprising a rotating polygon with a plurality of reflective facets individually operative to scan the at least one modulated light output of the at least one light source directly or indirectly to a photoreceptor of a printing system along a fast scan direction to generate an image on at least a portion of the photoreceptor according to the image data; and
   a controller operatively coupled with the driver to cause the driver to selectively vary an output level of the at least one modulated light output provided by the at least one light source during scanning by a given reflective facet of the rotating polygon to mitigate banding according to a given one of a plurality of banding correction profiles that corresponds to the given reflective facet.

2. The ROS of claim 1, wherein the at least one light source comprises at least one laser operative to generate a light output.

3. The ROS of claim 1:
wherein the at least one light source comprises a plurality of light sources individually operative to generate a corresponding light output;
wherein the driver is operative to selectively actuate the plurality of light sources individually according to corresponding scan line image data to produce a corresponding plurality of modulated light outputs;
wherein the rotating polygon is operative to direct the plurality of modulated light outputs directly or indirectly to the photoreceptor along the fast scan direction to generate the image on at least the portion of the photoreceptor according to the image data; and
wherein the controller is operative to cause the driver to selectively vary output levels of the plurality of modulated light outputs provided by the plurality of light sources during scanning by the given reflective facet of the rotating polygon to mitigate banding according to the given one of the plurality of banding correction profiles that corresponds to the given reflective facet.

4. The ROS of claim 3, further comprising an encoder providing an indication to the controller of the identity of the given reflective facet of the rotating polygon, wherein the controller is operative to select the given one of the plurality of banding correction profiles that corresponds to the given reflective facet according to the indication from the encoder.

5. The ROS of claim 1:
wherein the at least one light source comprises a plurality of light sources individually operative to generate a corresponding light output;
wherein the driver is operative to selectively actuate the plurality of light sources individually according to corresponding scan line image data to produce a corresponding plurality of modulated light outputs;
wherein the rotating polygon is operative to direct the plurality of modulated light outputs directly or indirectly to the photoreceptor along the fast scan direction to generate the image on at least the portion of the photoreceptor according to the image data; and
wherein the controller is operative to cause the driver to selectively vary output levels of individual ones of the plurality of modulated light outputs provided by the plurality of light sources during scanning by a given reflective facet of the rotating polygon to mitigate banding according to banding correction profiles corresponding to the individual light sources and to the given reflective facet.

6. The ROS of claim 5, further comprising an encoder providing an indication to the controller of the identity of the given reflective facet of the rotating polygon, wherein the controller is operative to select the banding correction profiles corresponding to the given reflective facet according to the indication from the encoder.

7. The ROS of claim 1, further comprising an encoder providing an indication to the controller of the identity of the given reflective facet of the rotating polygon, wherein the controller is operative to select the given one of the plurality of banding correction profiles that corresponds to the given reflective facet according to the indication from the encoder.

8. A document processing system, comprising:
at least one marking device operative to transfer marking material onto an intermediate medium;
a transfer station positioned proximate a travel path of the intermediate medium and operative to transfer the marking material from the intermediate medium to a printable media; and
a raster output scanner (ROS) operatively associated with the at least one marking station to generate an image on a portion of the intermediate medium traveling along a process path past the ROS, the ROS comprising:
at least one light source operative to generate a light output,
a driver operative to selectively actuate the at least one light source according to image data to produce at least one modulated light output,
a motor polygon assembly comprising a rotating polygon with a plurality of reflective facets individually operative to scan the at least one modulated light output of the at least one light source directly or indirectly to a photoreceptor of a printing system along a fast scan direction to generate an image on at least a portion of the photoreceptor according to the image data,
a controller operatively coupled with the driver to cause the driver to selectively vary an output level of the at least one modulated light output provided by the at least one light source during scanning by a given reflective facet of the rotating polygon to mitigate banding according to a given one of a plurality of banding correction profiles that corresponds to the given reflective facet, and
an encoder providing an indication to the controller of the identity of the given reflective facet of the rotating polygon,
wherein the controller is operative to select the given one of the plurality of banding correction profiles that corresponds to the given reflective facet according to the indication from the encoder.

9. The document processing system of claim 8, wherein the at least one light source comprises at least one laser operative to generate a light output.

10. The document processing system of claim 8:
wherein the at least one light source comprises a plurality of light sources individually operative to generate a corresponding light output;
wherein the driver is operative to selectively actuate the plurality of light sources individually according to corresponding scan line image data to produce a corresponding plurality of modulated light outputs;
wherein the rotating polygon is operative to direct the plurality of modulated light outputs directly or indirectly to the photoreceptor along the fast scan direction to generate the image on at least the portion of the photoreceptor according to the image data; and
wherein the controller is operative to cause the driver to selectively vary output levels of the plurality of modulated light outputs provided by the plurality of light sources during scanning by a given reflective facet of the rotating polygon to mitigate banding according the to given one of the plurality of banding correction profiles that corresponds to the given reflective facet.

11. The document processing system of claim 8:
wherein the at least one light source comprises a plurality of light sources individually operative to generate a corresponding light output;
wherein the driver is operative to selectively actuate the plurality of light sources individually according to corresponding scan line image data to produce a corresponding plurality of modulated light outputs;

wherein the rotating polygon is operative to direct the plurality of modulated light outputs directly or indirectly to the photoreceptor along the fast scan direction to generate the image on at least the portion of the photoreceptor according to the image data; and wherein the controller is operative to cause the driver to selectively vary output levels of individual ones of the plurality of modulated light outputs provided by the plurality of light sources during scanning by a given reflective facet of the rotating polygon to mitigate banding according to banding correction profiles corresponding to the individual light sources and to the given reflective facet.

12. A method for mitigating banding in a printing system, the method comprising:

selectively actuating at least one light source according to image data to produce at least one modulated light output;

using a given one of a plurality of reflective facets of a rotating polygon, scanning the at least one modulated light output of the at least one light source directly or indirectly to a photoreceptor of a printing system along a fast scan direction to generate an image on at least a portion of the photoreceptor according to the image data; and selectively varying an output level of the at least one modulated light output provided by the at least one light source during scanning by the given reflective facet according to a given one of a plurality of facet-specific banding correction profiles that corresponds to the given reflective facet.

13. The method of claim 12, comprising:

selectively actuating a plurality of light sources individually according to corresponding scan line image data to produce a corresponding plurality of modulated light outputs;

using the given one of the plurality of reflective facets of the rotating polygon, scanning the plurality of modulated light outputs directly or indirectly to the photoreceptor along the fast scan direction to generate an image on at least a portion of the photoreceptor according to the image data; and selectively varying output levels of the plurality of modulated light outputs provided by the plurality of light sources during scanning by the given reflective facet to mitigate banding according to the given one of the plurality of facet-specific banding correction profiles that corresponds to the given reflective facet.

14. The method of claim 12, comprising:

selectively actuating a plurality of light sources individually according to corresponding scan line image data to produce a corresponding plurality of modulated light outputs;

using the given one of the plurality of reflective facets of the rotating polygon, scanning the plurality of modulated light outputs directly or indirectly to the photoreceptor along the fast scan direction to generate an image on at least a portion of the photoreceptor according to the image data; and selectively varying output levels of individual ones of the plurality of modulated light outputs provided by the plurality of light sources during scanning by the given reflective facet to mitigate banding according to facet-specific banding correction profiles corresponding to the individual light sources and to the given reflective facet.

* * * * *